(12) United States Patent
Netz et al.

(10) Patent No.: US 11,598,941 B2
(45) Date of Patent: Mar. 7, 2023

(54) METHOD FOR OPERATING A LIGHT MICROSCOPE WITH STRUCTURED ILLUMINATION AND OPTIC ARRANGEMENT

(71) Applicant: Carl Zeiss Microscopy GmbH, Jena (DE)

(72) Inventors: Ralf Netz, Jena (DE); Gerhard Krampert, Pleasanton, CA (US)

(73) Assignee: CARL ZEISS MICROSCOPY GmbH, Jena (DE)

(*) Notice: Subject to any disclaimer, the term of this patent is extended or adjusted under 35 U.S.C. 154(b) by 953 days.

(21) Appl. No.: 16/423,983

(22) Filed: May 28, 2019

(65) Prior Publication Data

US 2019/0369376 A1 Dec. 5, 2019

(30) Foreign Application Priority Data

Jun. 4, 2018 (DE) .......................... 102018113208.5

(51) Int. Cl.
*G02B 21/00* (2006.01)

(52) U.S. Cl.
CPC ..... *G02B 21/0032* (2013.01); *G02B 21/0072* (2013.01)

(58) Field of Classification Search
CPC ............ G02B 21/0072; G02B 21/0052; G02B 21/0032; G02B 21/0024; G02B 21/002
See application file for complete search history.

(56) References Cited

U.S. PATENT DOCUMENTS 10,113,856 B2 * 10/2018 Everett .............. G01B 9/02091
2013/0336819 A1 12/2013 Cooper
(Continued)

FOREIGN PATENT DOCUMENTS

| CN | 103477209 A | 12/2013 |
| CN | 104823096 A | 8/2015 |

(Continued)

OTHER PUBLICATIONS

Bertero, M., et al.; "Super-resolution in confocal scanning microscopy"; Inverse Problems 1987; 3:195-212.
(Continued)

*Primary Examiner* — John R Lee
(74) *Attorney, Agent, or Firm* — Duane Morris LLP; Arthur M. Dresner

(57) ABSTRACT

A method for operating a light microscope with structured illumination includes: providing illumination patterns by means of a structuring device which splits impinging light into at least three coherent beam parts which correspond to a −1., 0., and +1. diffraction orders of light; generating different phases of the illumination patterns by setting different phase values for the beam parts with phase shifters; and recording at least one microscope image for each of the illumination patterns and calculating a high resolution image from the microscope images. Phase shifters are provided not only for the beam parts of the −1. and +1. diffraction orders but also at least one phase shifter for the beam part of the 0. diffraction order. At least two different phase values $\Phi_0$ are set with the at least one phase shifter for the 0. diffraction order to provide a plurality of illumination patterns with different phases.

15 Claims, 5 Drawing Sheets

(56) References Cited

U.S. PATENT DOCUMENTS

2015/0248015 A1* 9/2015 Schwedt ............ G02B 26/0816
359/371
2019/0369376 A1* 12/2019 Netz ....................... G02F 1/292

FOREIGN PATENT DOCUMENTS

| DE | 162017109645 A1 | 11/2018 |
| JP | 2015099177 A | 5/2015 |
| WO | 9624082 | 8/1996 |
| WO | 2014060270 A2 | 4/2014 |

OTHER PUBLICATIONS

Sheppard, C.J.R.; "Super-resolution in Confocal Imaging"; Optik 1988; 80(2):53-54.
Grochmalicki, J., et al.; "Superresolving masks for incoherent scanning microscopy"; J. Opt. Soc. Am. A 1993; 10 (5):1074-1077.
Mueller, C.B., et al.; "Image Scanning Microscopy"; Physical Review letters 2010; 104:198101-1-198101-4.
Schwartz, O., et al.; "Fluorescence antibunching microscopy"; Proceedings of SPIE 2012; 8228:822802-1-822802-4.
Dertinger T., et al.; "Fast, background-free, 3D super-resolution optical fluctuation imaging (SOFI)"; PNAS 2009; 106(52):22287-22292.
Lukosz, W., et al.; "Optischen Abbildung unter Uberschreitung der beugungsbedingten Auflosungsgrenze"; Journal of Modern Optics 1963; 10(3):241-265.
Heintzmann, R., et al.; "Laterally Modulated Excitation Microscopy: Improvement of resolution by using a diffraction grating"; Proceedings of SPIE 1999; 3568:185-196.
Gustafsson, Mats, G.L., et al.; "Doubling the lateral resolution of wide-field fluorescence microscopy using structured illumination"; Proceedings of SPIE 2000; 3919:141-150.
Shao, L., et al.; "Super-resolution 3D-microscopy of live whole cells using structured: illumination"; Nature Methods 2011; 8(12):1044-1046.
Heintzmann, R., et al.; "Saturated patterned excitation microscopy—a concept for optical resolution improvement"; J. Opt. Soc. Am. A 2002; 19(8); 1599-1609.
Geuzebroek, Douwe, et al.; "Photonics Packaging Made Visible": Optik&Photonik 2017; 5:34-38.
German Search Report dated Feb. 28, 2019.
First Office Action with Search Report dated Jun. 27, 2022 for 201910468855.X.

* cited by examiner

METHOD FOR OPERATING A LIGHT MICROSCOPE WITH STRUCTURED ILLUMINATION AND OPTIC ARRANGEMENT

RELATED APPLICATIONS

The present application claims priority benefit of German Application No. DE 10 2018 113 208.5 filed on Jun. 4, 2018, the contents of which are incorporated by reference in its entirety.

TECHNICAL FIELD OF THE INVENTION

The present invention relates in a first aspect to a method for operating a light microscope with structured illumination. In a second aspect the invention relates to an optic arrangement for structured illumination in a light microscope.

BACKGROUND OF THE INVENTION

In a generic method for operating a light microscope with structured illumination, a structuring device produces illumination patterns. The structuring device splits impinging light in at least three coherent beam parts which correspond to a −1., 0. and +1. diffraction order of light.

The structuring device may, for example, have a grating (phase diffraction grating) in an intermediate image plane of the illumination beam path. Light is diffracted at the grating and thus beam parts of a −1., 0. and +1. diffraction order, inter alia, are produced. In the specimen plane, the beam parts interfere and thus produce a structured illumination. Such an illumination pattern in the specimen plane may constitute a grating structure, for example a line structure consisting of alternating bright and dark areas. Several specimen images are recorded with differently rotated lattice vectors of the gratings in the intermediate image plane. As examples, the grating may be rotated to this end, or differently oriented gratings are illuminated one after the other. Furthermore, several microscope images with different phases of the illumination modulation are recorded. For shifting the phase, the grating may be shifted in the intermediate image plane, for example, or a plane-parallel wobble plate near an intermediate image plane may be tilted.

Alternatively the structuring device may comprise a waveguide chip instead of a grating. A waveguide chip is also referred to as a photonic integrated circuit (PIC) and comprises a substrate in which light guide channels are formed. These light guide channels are usually no hollow spaces but differ in the material from surrounding substrate. The waveguide chip comprises at least an input port for light at which impinging light is forwarded and split in the waveguide chip into at least three path sections (light guide channels) which lead to at least three exit ports. One impinging light beam may thus lead to three coherent beam parts which exit at the exit ports and may interfere with each other in the specimen plane. The at least three exit ports and their respective path sections correspond to −1., 0. and +1. diffraction orders of light, i.e., the exit ports may be arranged to form a dot pattern in a pupil plane of the illumination beam path which corresponds to the dot pattern which would be formed in a pupil plane by a grating arranged in an intermediate image plane. Alternatively it is not necessary that the exit ports are arranged in this dot pattern; rather light may be guided from the exit ports via, for example, optical fibers to form said dot pattern in a pupil plane. In a cross-section of the illumination light, the 0. diffraction order is located between the +1. and −1. diffraction orders and may in particular have the same spatial distance to the +1. diffraction order and to the −1. diffraction order.

In the generic method, a plurality of illumination patterns with different phases are provided one after the other. To this effect, different phase shifts for the beam parts are set with phase shifters. At least one microscope image is recorded for each of the illumination patterns and then the microscope images are used to calculate a high resolution image.

Via different input ports of the waveguide chip, differently oriented illumination patterns can be generated, wherein different phases of the illumination patterns are respectively set with the phase shifters.

The calculated high resolution image is to be understood as an image which is calculated from the plurality of microscope images. As it includes information from all microscope images, it is referred to as high resolution, which, however, shall not be construed as any specification of an image resolution.

Analogously, a generic optic arrangement for structured illumination comprises a structuring device which splits impinging light in at least three coherent beam parts which correspond to −1., 0. and +1. diffraction orders of light, respectively. In particular, the structuring device may comprise a waveguide chip, comprising at least an input port followed by a light guide path which forks into at least three path sections which in turn lead to at least three exit ports of the waveguide chip. Two outer exit ports and their respective path sections are, in short, referred to as "(corresponding to) a −1. and +1. diffraction orders of light". This shall illustrate that light beams emanating from the outer exit ports may correspond to the −1. diffraction order and the +1. diffraction order of light diffracted at a grating. A respective central exit port which is situated between the two outer exit ports and its respective path section is referred to as corresponding to a 0. diffraction order due to its central arrangement of the exit port. The waveguide chip further comprises a respective phase shifter at each path section for shifting a phase of light in these path sections.

Generic methods and optic arrangements for structured illumination are described by the applicant in DE 10 2017 109 645.0. Another optic arrangement with waveguide chip is furthermore described by the applicant in WO 2014/060270 A2.

A difficulty resides in providing sufficiently large phase shifts steadily, precisely and efficiently. These challenges are hard to overcome with, in particular, phase shifters arranged at a waveguide chip. With thermal phase shifters, for example, sufficiently large temperature differences need to be set at the path sections of the waveguide chip. Even if this succeeds, the problem remains that the considerable temperature differences may possibly result in no stable phase variation of a desired size. Also with other phase shifters, for example piezoelectric phase shifters, difficulties arise, in particular in material stress caused by the comparably strong piezoelectric expansion and compression, and in possibly occurring hysteresis in which the material remains partially deformed even if the setting is changed back to an initial value.

Another optic arrangement for providing a structured illumination is described in US2013/0335819A1. Differences over this document are addressed in a later section.

It may be regarded as an object of the invention to indicate a method and an optic arrangement which provide a structured illumination for a light microscope, wherein a phase of illumination patterns can be varied in a simple and efficient way.

SUMMARY OF THE INVENTION

Various example embodiments relate to methods for operating a light microscope with structured illumination. One such method includes: providing illumination patterns by means of a structuring device which splits impinging light into at least three coherent beam parts which correspond to a −1., 0. and +1. diffraction orders of light. Different phases of the illumination patterns are caused by setting different phase values for the beam parts with phase shifters. The phase shifters are not only provided for the beam parts of the −1. and +1. diffraction orders but also for the beam part of the 0. diffraction order. At least two different phase values $\Phi_0$ are set with the at least one phase shifter for the 0. diffraction order to provide a plurality of illumination patterns with different phases. At least one microscope image per illumination pattern is recorded. A high resolution image is then calculated from the recorded-microscope images.

Another set of example embodiments relate to an optic arrangement for structured illumination in a light microscope. The optic arrangement has a structuring device configured to split impinging light in at least three coherent beam parts which correspond to a −1., 0. and +1. diffraction orders of light. The arrangement further includes a plurality of phase shifters configured to shift the phases of the beam parts for setting different phases of illumination patterns. The arrangement also has a control unit configured for setting different phase shifts not only with the phase shifters of the −1. and +1. diffraction orders, but also setting at least two different phase values with the phase shifter or phase shifters belonging to the 0. diffraction order, and calculating the high resolution image from the thus recorded microscope images.

A focus of the invention resides in the way how to set phase shifts of the beam parts that interfere in the specimen plane to form an illumination pattern. The structuring device which splits light into the coherent beam parts may be formed in basically any way. For example, gratings may be used as the structuring device. At the grating, the light is diffracted into a plurality of diffraction orders, wherein these beam parts are spatially separated from each other in a pupil plane or in a region of a pupil plane where they can be modified independently from each other. A beam part is here understood as either a diffraction order of light or a light beam corresponding to a diffraction order. The latter is the case if the structuring device comprises a light splitter instead of a diffractive element; the splitter being configured to split impinging light into a plurality of beam parts. These beam parts may be guided such that their arrangement in a pupil plane forms a pattern that just corresponds to the beam parts of the −1., 0. and +1. diffraction orders of a grating (which grating would be arranged in an intermediate image plane). For example, the structuring device may comprise a waveguide chip which may be designed as described above.

At least one splitter may be integrated in the waveguide chip. After the splitter, the beam parts are guided along respective path sections in the waveguide chip. An optic arrangement with a waveguide chip offers a particularly compact design with a low number of components, or a low number of components moveable relative to each other. However, even without a waveguide chip, splitters may be used, wherein the beam parts are then guided by, e.g., optical fibers and/or mirrors into a desired illumination spot pattern.

Furthermore, phase modulators may be used as structuring devices as described in Applicant's yet unpublished applications DE 102018110072, DE 102018110083, DE 102018110109 and DE 10 2018110117. With these phase modulators, the phase is shifted per pixel over the cross-section of a light beam. This may be realized with, e.g., a liquid crystal matrix or a matrix of liftable mirrors. In this way, in the region of a pupil plane, the beam parts are spatially separated from each other and may be modified independently from each other with phase shifters. Depending on the kind of structuring device, also beam parts of higher diffraction orders may occur. Such beam parts of higher diffraction orders may be filtered out and only the beam parts which correspond to the −1., 0. and +1. diffraction orders are guided further towards the specimen plane.

For easier understanding, the following explanations often refer exemplarily to a waveguide chip. It is to be understood that these variants of the invention may also be modified by forming the structuring device without a waveguide chip, for example with gratings, the above-mentioned phase modulators or with splitters and optical fibers.

For easier comprehension of the effects of the invention, a mathematical description of the illumination patterns shall now be given. By means of the waveguide chip or a differently designed structuring device, a plurality of beam parts are produced which interfere with each other in a specimen plane and thus form the illumination pattern. The beam parts correspond to a −1., 0. and +1. diffraction orders which would result from illuminating a grating in an intermediate image plane. It will be shown that the illumination pattern can be described by a first order modulation contrast and a second order modulation contrast, wherein the second order modulation contrast indicates that a periodic intensity variation (a cosine function) changes spatially with double the frequency of the first order modulation contrast. The phase of the second order modulation contrast is described by a phase value $\Phi_1$ which is set for the beam part of the +1. diffraction order, and by a phase value $\Phi_{-1}$ which is set for the beam part of the −1. diffraction order. The phase of the first order modulation contrast is not only determined by the phase values $\Phi_1$ and $\Phi_{-1}$, but also by a phase value $\Phi_0$ that is set for the beam part of the 0. diffraction order. For shifting the phase of the illumination pattern, the invention also uses a certain change of the phase value $\Phi_0$. This has the consequence that $0_1$ and $0_{-1}$ merely need to be changed to a lesser extent. Thus, with the invention the phase shifters only need to set smaller phase shifts compared with conventional methods. Nevertheless, the same phase shift of the illumination patterns is achieved as in scenarios not falling under the invention in which $\Phi_1$ and $\Phi_{-1}$ are strongly varied but $\Phi_0$ is constant for all measurements.

For the mathematical description, the electric field vectors $E_0$, $E_1$, and $E_2$ of the three beam parts of the 0., +1. and −1. diffraction orders will now be defined. The vector arrows are omitted in the continuous text. Throughout the following description, the index 2 will indicate the −1. diffraction order:

$$\vec{E}_1 = \frac{1}{2} e^{i(\vec{k}_1 \cdot \vec{r} + \phi_1)} \{c \cdot \vec{e}_{p,y} + a \cdot \vec{e}_{p,z,x,1} \cdot e^{i\delta_1}\} + conj.\ comp. = \tilde{\vec{E}}_1 + \tilde{\vec{E}}_1^*$$

$$\vec{E}_2 = \frac{1}{2} e^{i(\vec{k}_2 \cdot \vec{r} + \phi_2)} \{c \cdot \vec{e}_{p,y} + a \cdot \vec{e}_{p,z,x,2} \cdot e^{i\delta_2}\} + conj.\ comp. = \tilde{\vec{E}}_2 + \tilde{\vec{E}}_2^*$$

$$\vec{E}_0 = \frac{1}{2} e^{i(\vec{k}_0 \cdot \vec{r} + \phi_0)} \{b \cdot \vec{e}_{p,y} + d \cdot \vec{e}_{p,z,x,0} \cdot e^{i\delta_0}\} + conj.\ comp. = \tilde{\vec{E}}_0 + \tilde{\vec{E}}_0^*$$

Here, i is the imaginary t; $k_1$, $k_2$, $k_0$ are the wave number vectors (spatial frequencies), r is the spatial vector, $\Phi_1$, $\Phi_2$ and $\Phi_0$ are the phases, $e_{p,y}$ is the unit vector of the electric field in the y direction for each beam part, $e_{p,z,x,1}$, $e_{p,z,x,2}$ and $e_{p,z,x,0}$ are the unit vectors of the electric field in the x-z plane for the three beam parts; $e^{i\delta_1}$, $e^{i\delta_2}$ and $e^{i\delta_0}$ indicate a phase offset of the electric field in the x-z plane relative to the electric field in the y direction; a b, c, d are amplitudes/constants and conj.comp. indicates the complex conjugate of the whole respectively preceding expression. The imaginary part cancels out due to the sum with conj.comp. and the multiplication with ½. Thus only the real part of the respective electric field remains. The wave number vectors $k_1$, $k_2$, $k_0$ are shown in FIG. 1. FIG. 1 illustrates that the wave number vectors $k_1$, $k_2$, $k_0$ are characterized by:

$$\vec{k}_1 = \frac{2\pi}{\lambda}\{\cos(\varphi)\vec{e}_x + \sin(\varphi)\vec{e}_z\}$$

$$\vec{k}_2 = \frac{2\pi}{\lambda}\{-\cos(\varphi)\vec{e}_x + \sin(\varphi)\vec{e}_z\}$$

$$\vec{k}_0 = \frac{2\pi}{\lambda}\vec{e}_z$$

Here, $e_x$, $e_y$ and $e_z$ are the unit vectors in the x, y, and z directions, $\varphi$ is the angle of the wave number vectors relative to the x axis and $\lambda$ is the wavelength of the light in the medium. The angle of the wave number vector relative to the y axis $\theta$ is 90° (see FIG. 1), and thus:

$$\vec{e}_{p,y} = -\vec{e}_y$$

$$\vec{e}_{p,z,x,1} = (\sin(\theta)\sin(\varphi)\vec{e}_x - \cos(\theta)\vec{e}_y - \sin(\theta)\cos(\varphi)\vec{e}_z) = \sin(\varphi)\vec{e}_x - \cos(\varphi)\vec{e}_z$$

$$\vec{e}_{p,z,x,2} = (\sin(\theta)\sin(\varphi)\vec{e}_x - \cos(\theta)\vec{e}_y - \sin(\theta)\cos(\varphi)\vec{e}_z) = \sin(\varphi)\vec{e}_x - \cos(\varphi)\vec{e}_z$$

$$\vec{e}_{p,z,x,0} = \sin(\theta)\vec{e}_x = \cos(\theta)\vec{e}_y = \vec{e}_x$$

The electric field intensity I is proportional to the square of the sum of the electric fields $E_0$, $E_1$, $E_2$ of the three beam parts, wherein the square is determined by multiplication with the complex conjugates $E_0^*$, $E_1^*$, $E_2^*$:

$$I \propto \{\vec{E}_1 + \vec{E}_2 + \vec{E}_0\} \cdot \{\vec{E}_1' + \vec{E}_2' + \vec{E}_0'\}$$

$$I \propto |\vec{E}_1|^2 + |\vec{E}_2|^2 + |\vec{E}_0|^2 + \vec{E}_2\vec{E}_1' + \vec{E}_0\vec{E}_1' + \vec{E}_1\vec{E}_0' + \vec{E}_0\vec{E}_2' + \vec{E}_2\vec{E}_0'$$

The square terms $E_0^2$, $E_1^2$, $E_2^2$ are constants:

$$|\vec{E}_1|^2 = |\vec{E}_2|^2 = c^2 + a^2$$

$$|\vec{E}_0|^2 = b^2 + d^2$$

Using these constants, the above expression for the electric field intensity I is reworded as:

$$I \propto 2\{[c^2 + a^2] + \cos[2k_{1x} \cdot x + (\phi_1 - \phi_2)] \cdot (c^2 + a^2[\sin^2(\varphi) - \cos^2(\varphi)])\} +$$

$$2\left\{\frac{[b^2 + d^2]}{2} + 2 \cdot \cos\left[-\left(k_{1x} \cdot x + \frac{\phi_1 - \phi_2}{2}\right)\right] \cdot\right.$$

$$\left.\cos\left[(|\vec{k}_0| - k_{1z}) \cdot z + \frac{2\phi_0 - \phi_1 - \phi_2}{2}\right](b \cdot c + d \cdot a\sin(\varphi))\right\}$$

By using the expression of the wave number vectors k according to FIG. 1, the following expression results:

$$I \propto$$

$$2\left\{[c^2 + a^2] + \cos\left[2\frac{2\pi}{\lambda}\cos(\varphi) \cdot x + (\phi_1 - \phi_2)\right] \cdot (c^2 + a^2[\sin^2(\varphi) - \cos^2(\varphi)])\right\} +$$

$$2\left\{\frac{[b^2 + d^2]}{2} + 2 \cdot \cos\left[\frac{2\pi}{\lambda}\cos(\varphi) \cdot x + \frac{\phi_1 - \phi_2}{2}\right] \cdot\right.$$

$$\left.\cos\left[\frac{2\pi}{\lambda}(1 - \sin(\varphi)) \cdot z + \frac{2\phi_0 - \phi_1 - \phi_2}{2}\right](b \cdot c + d \cdot a\sin(\varphi))\right\}$$

As can be seen, the illumination intensity I comprises two summed modulation terms (cosine functions). The modulation term $$\cos\left[2\frac{2\pi}{\lambda}\cos(\varphi) \cdot x + (\phi_1 - \phi_2)\right]$$

in the first row is referred to as second order modulation term since its spatial frequency is double the frequency of the other modulation term, i.e., the first order modulation term reproduced in the second line above and comprising $$\cos\left[\frac{2\pi}{\lambda}\cos(\varphi) \cdot x + \frac{\phi_1 - \phi_2}{2}\right].$$

For recording a plurality of microscope images with different phases of the structured illumination, the phases in the above wave expressions must be varied. For the second order modulation contrast, it is thus necessary to vary the phase offset ($\Phi_1-\Phi_2$). For the first order modulation contrast, it is necessary to consider that two cosine functions are multiplied:

$$\cos\left[\frac{2\pi}{\lambda}\cos(\varphi) \cdot x + \frac{\phi_1 - \phi_2}{2}\right] \cdot \cos\left[\frac{2\pi}{\lambda}(1 - \sin(\varphi)) \cdot z + \frac{2\phi_0 - \phi_1 - \phi_2}{2}\right]$$

Thus a phase shift may not only be achieved by varying $\Phi_1$ and $\Phi_2$, it is rather also possible to vary $\Phi_0$ in order to achieve a phase shift of the intensity pattern.

With a suitable change of $\Phi_0$, the required changes of $\Phi_1$ and $\Phi_2$ are smaller compared with the case that $\Phi_0$ would have the same value for all image recordings.

This finding is used in the invention.

According to the invention, the method of the above-referenced kind does not only employ phase shifters for each of the −1. and +1. diffraction order beam parts. Rather, also at least one phase shifter for each 0. diffraction order beam part is provided. For providing a plurality of illumination patterns of different phases, at least two different phase values for $\Phi_0$ are set with the phase shifter for the 0. diffraction order.

The optic arrangement of the above-referenced kind comprises, according to the invention, a control unit configured to set different phase shifts not only with the phase shifters belonging to the −1. and +1. diffraction order beam parts. Rather, also the phase shifter(s) belonging to the 0. diffraction order are used to set at least two different phase values, in particular two phase values varying from each other exactly by $\pi$.

Advantageously, by using different phase values $\Phi_0$, smaller changes of $\Phi_1$ and $\Phi_2$ suffice.

Other conventional systems, which do not use a waveguide chip and integrated phase shifters as a structuring device, do not change $\Phi_0$ in the way the invention requires. US 2013/0335819 A1, for example, describes a setup for structured illumination in which three beam parts are produced which correspond to a $-1$., 0. and 1. diffraction order of light. Pivotable transparent plates are used here as phase shifters. The beam parts that correspond to the $-1$. and 1. diffraction orders are phase shifted with phase shifters as shown in FIG. 7A of US 2013/0335819 A1. For the 0. diffraction order, in contrast, it is not described to change the phase such that already smaller phase variations for the $-1$. and 1. diffraction order suffice for changing the phase of the illumination intensity pattern in the specimen plane as desired. According to the invention, the microscope images used together for calculating a high resolution image are recorded with at least two different phase values for the beam part of the 0. diffraction order. The afore-mentioned prior art at most mentions that a plurality of phase shifters may be provided for the beam parts, however, it does not disclose to use two or more different settings with a phase shifter for the 0. diffraction order within the measurement sequence for generating a high resolution image (i.e., in the measuring sequence for a sole image in contrast to different measurement sequences for different high resolution images).

In some variants of the invention, microscope images may be recorded for which the phase shifter of the 0. diffraction order is set to two different phase values $\Phi_0$ which differ from each other by $\pi$. As apparent from the above expression for the first order modulation contrast, a change of $\Phi_0$ by $\pi$ leads to a change in the $+/-$ sign of the expression $$\cos\left[\frac{2\pi}{\lambda}(1-\sin(\varphi))\cdot z + \frac{2\phi_0 - \phi_1 - \phi_2}{2}\right];$$

the reason being, as it is well-known, that a cosine function changes its $+/-$ sign but continues to have the same absolute value when shifted by $\pi$. If the whole phase region shall be selectable for the first order modulation contrast, a constant $\Phi_0$ would require the phase expression $(\Phi_1-\Phi_2)/2$ in $$\cos\left[\frac{2\pi}{\lambda}\cos(\varphi)\cdot x + \frac{\phi_1-\phi_2}{2}\right]$$

to be varied over an interval of $2\pi$; instead, the change in the $+/-$ sign due to a change of $\Phi_0$ by $\pi$ results in that the phase expression $(\Phi_1-\Phi_2)/2$ only needs to be varied by $1\pi$ in order to cover the whole phase region.

For each of the two phase values of $\Phi_0$ of the phase shifter for the 0. diffraction order, which phase values differ from each other by $\pi$, (i.e., for each of the two $\Phi_0$ values,) different phase shifts (i.e., different phase values/phase settings) may be set with the phase shifters of the $-1$. and $+1$. diffraction orders, i.e., different pairs of $\Phi_1$, $\Phi_2$, wherein in each case a microscope image is recorded. For example, two or more microscope images with the same $\Phi_0$ and with different pairs of $\Phi_1$, $\Phi_2$ may be recorded, and additionally two or more microscope images with $\Phi_0$ changed by $\pi$ and with different pairs of $\Phi_1$ and $\Phi_2$ are recorded.

As phase shifters, in principle any elements may be used that are adapted to variably change a phase of impinging light. For example, movable/pivotable transparent plates may be arranged in the beam paths of the different beam parts. The phase shifters may also be integrated in the waveguide chip. In this case the phase shifters are provided at the respective path sections that belong to the beam parts of the $-1$, 0. and $+1$. diffraction orders. Also a plurality of phase shifters may be consecutively arranged along one and the same path section for easier generation of sufficiently large phase shifts. Thermal phase shifters, piezoelectric phase shifters, electro-optic phase shifters or acousto-optic phase shifters may be used, in particular integrated in a waveguide chip. A thermal phase shifter changes the temperature of a respective path section. Depending on the temperature, the optic path lengths changes and hence the phase is shifted. With a piezoelectric phase shifter, an applied electric voltage extends or compresses the material of the respective path section and thus varies the optical path length. With an electro-optical phase shifter, an electric voltage can be applied at electrodes arranged at the waveguide chip next to a path section, and thus an electric field is produced in the respective path section. This changes the index of refraction in the path section and thus the phase of light running in that path section is shifted. An acousto-optic phase shifter is configured to generate an acoustic wave in the respective path section, whereby an optical path length for the light wave is changed.

For providing the different illumination patterns, the two phase shifters belonging to the $-1$. and $+1$. diffraction orders may be changed in opposite directions, starting from a specific operating point. A thermal phase shifter will thus, starting from an operating point of e.g. 200° C., heat the $+1$. diffraction order path section while the $-1$. diffraction order path section is cooled/allowed to cool down. Thus $\Phi_1$ and $\Phi_2$ are changed in opposite directions. The phase of the first order modulation contrast as well as the phase of the second order modulation contrast depend on the difference $(\Phi_1-\Phi_2)$. Therefore, the change in opposite directions constitutes an efficient phase change and does not require undue large changes of one of the two values $\Phi_1$ and $\Phi_2$.

The phase shifters for the $-1$. and $+1$. diffraction orders may also be changed in opposite directions, starting from the operating point, such that the resulting phase shifts of $\Phi_1$ and $\Phi_2$ for the $-1$. and $+1$. diffraction orders have the same absolute value but different $+/-$ signs. That means in particular $\Phi_1=-\Phi_2$ or $\Delta\Phi_1=-\Delta\Phi_2$, wherein $\Delta\Phi_1$ and $\Delta\Phi_2$ are the phase shifts relative to phase values $\Phi_1$ and $\Phi_2$, with which a microscope image is recorded. This not only avoids the problem that unequal changes of the absolute values of $\Phi_1$ and $\Phi_2$ would require undue large variations of one of the two values in order to cover the whole phase region. Rather, setting $\Phi_1=-\Phi_2$, also has the substantial advantage that in the expression $$\cos\left[\frac{2\pi}{\lambda}(1-\sin(\varphi))\cdot z + \frac{2\phi_0 - \phi_1 - \phi_2}{2}\right]$$

of the first order modulation contrast, the part $(-\Phi_1-\Phi_2)/2$ is always constant or zero, i.e., in particular $$\frac{2\phi_0 - \phi_1 - \phi_2}{2} = \phi_0$$

may be true, and thus this cosine term may be varied solely by $\Phi_0$; the other parameters of this expression (considered as a whole) remain constant while setting the different phases and recording the microscope images. If now $\Phi_0$ is set to either one of two values that differ from each other by $\pi$, the +/− sign of this expression changes, and $\Phi_1$ and $\Phi_2$ are only relevant for the first cosine term of the expression of the first order modulation contrast:

$$\cos\left[\frac{2\pi}{\lambda}\cos(\varphi)\cdot x + \frac{\phi_1 - \phi_2}{2}\right] \cdot \cos\left[\frac{2\pi}{\lambda}(1-\sin(\varphi))\cdot z + \frac{2\phi_0 - \phi_1 - \phi_2}{2}\right].$$

It is easily understood in this expression that the phase $(\Phi_1-\Phi_2)/2$ does not need to be varied by more than $1\pi$ to cover the whole phase region if additionally $\Phi_0$ is changed by $\pi$.

In some variants of the invention, the different illumination patterns are provided by adjusting the phase shifters for the −1. and +1. diffraction orders over an interval in which a phase shift $(\Phi_1-\Phi_2)/2$ of a first order modulation contrast spans at most an interval of $\pi$, i.e., in particular, $0\leq(\Phi_1-\Phi_2)/2\leq\pi$. For providing phase shifts of a first order modulation contrast that are larger than $\pi$, additionally the phase shifter for the 0. diffraction order changes the phase shift $\Phi_0$, in particular $\Phi_0$ is varied by $\pi$.

All microscope images used to calculate a high resolution image may thus be recorded while different illumination patterns are produced for which the phase shifters belonging to the −1. diffraction order and the +1. diffraction order are adjusted such that always $0\pi\leq(\Phi_1-\Phi_{-1})/2\leq 1\pi$ is true. As noted above, $\Phi_{-1}$ and $\Phi_2$ are synonymously used to indicate the phase shift at the path section for the −1. diffraction order. For providing a phase shift of the first order modulation contrast within an interval corresponding to $1\pi \ldots 2\pi$, now $\Phi_1$ and $\Phi_{-1}$ are not varied such that $1\pi\leq(\Phi_1-\Phi_{-1})/2\leq 2\pi$ would apply. Rather, the phase value $\Phi_0$ for the 0. diffraction order is changed by $\pi$ while the phase shifters for the −1. and +1. diffraction orders are still adjusted such that always $0\pi\leq(\Phi_1-\Phi_{-1})/2\leq 1\pi$ applies.

Due to the change of $\Phi_0$ it suffices if a maximal difference between settings of the phase shifters for the −1. and +1. diffraction orders, i.e., a maximal temperature difference between two thermal phase shifters, a maximal voltage difference between two piezoelectric or electro-optic phase shifters or a maximal frequency difference between two acousto-optic phase shifters, is at most as large that $(\Phi_1-\Phi_{-1})/2\leq 1\pi$ is still fulfilled at the maximal difference.

In the following, with reference to a table it is illustrated how the phase shifts according to some embodiments of the invention may be set for allowing to shift the phase over the whole phase region without excessively large changes of $\Phi_1$ and $\Phi_{-1}$. In this example, the whole phase region of $2\pi$ is covered by five steps, i.e., by the phase steps: $0\cdot 2\pi/5$, then $1\cdot 2\pi/5$, then $2\cdot 2\pi/5$, then $3\cdot 2\pi/5$ and finally $4\cdot 2\pi/5$. The phase of the first order modulation contrast shall be changed in these steps. According to the above formula, the phase of the second order modulation contrast varies double as fast (i.e., by $(\Phi_1-\Phi_{-1})$ instead of $(\Phi_1-\Phi_{-1}/2)$ so that the phase steps for the second order modulation contrast are indicated below for covering $4\pi$.

First order modulation contrast:
$$\cos\left[\frac{2\pi}{\lambda}\cos(\varphi)\cdot x + \frac{\phi_1-\phi_2}{2}\right]\cdot\cos\left[\frac{2\pi}{\lambda}(1-\sin(\varphi))\cdot z + \frac{2\phi_0 - \phi_1 - \phi_2}{2}\right]$$

|  | 1. phase step: $0\cdot 2\pi/5 = 0\cdot\pi$ | 2. phase step: $1\cdot 2\pi/5 = 0,4\cdot\pi$ | 3. phase step: $2\cdot 2\pi/5 = 0,8\cdot\pi$ | 4. phase step: $3\cdot 2\pi/5 = 1,2\cdot\pi$ | 5. phase step: $4\cdot 2\pi/5 = 1,6\cdot\pi$ |
|---|---|---|---|---|---|
| setting for $\phi_0$ | 0 | 0 | 0 | $\pi$ | $\pi$ |
| setting for $\frac{\phi_1-\phi_2}{2}$ | $0\cdot\pi$ | $0,4\cdot\pi$ | $0,8\cdot\pi$ | $0,2\cdot\pi$ | $0,6\cdot\pi$ |

Second order modulation contrast: $\cos\left[2\frac{2\pi}{\lambda}\cos(\varphi)\cdot x + (\phi_1-\phi_2)\right]$

|  | 1. phase step: $0\cdot 4\pi/5 = 0\cdot\pi$ | 2. phase step: $1\cdot 4\pi/5 = 0,8\cdot\pi$ | 3. phase step: $2\cdot 4\pi/5 = 1,6\cdot\pi$ | 4. phase step: $3\cdot 4\pi/5 = 2,4\cdot\pi = 2\pi + 0,4\pi$ | 5. phase step: $4\cdot 4\pi/5 = 3,2\cdot\pi = 2\pi + 1,2\pi$ |
|---|---|---|---|---|---|
| setting for $(\phi_1-\phi_2)$ | $0\cdot\pi$ | $0,8\cdot\pi$ | $1,6\cdot\pi$ | $0,4\cdot\pi$ | $1,2\cdot\pi$ |

As described above, $\Phi_1$ and $\Phi_2$ may be varied in opposite directions and by the same absolute values, i.e., such that $\Phi_1=\Phi_2$.

As indicated, for shifting the phase of the first order modulation contrast by, e.g., $1,2\cdot\pi$, the expression $$\frac{\phi_1-\phi_2}{2}$$

is not varied by $1,2\cdot\pi$ but only by $0,2\cdot\pi$. This is compensated by simultaneously varying $\Phi_0$ by $\pi$. It shall be stressed that $\Phi_0$ and the expression $$\frac{\phi_1-\phi_2}{2}$$

effect different terms and their effects thus do not simply correspond to their sum (see formulas above for the first order modulation contrast). Due to the phase jump of $\Phi_0$ by $\pi$, any phase shifts with the whole phase region of $2\pi$ can be set without the need to set extreme changes with the phase shifters. In particular, it may be provided that $\Phi_0$ is only switched between exactly two values which differ from each other by $\pi$, for all recorded microscope images.

According to the table above, a phase shift of the first order modulation contrast between $1\pi$ and $2\pi$ is set by means of a phase shift of $\Phi_0$ without changing $$\frac{\phi_1 - \phi_2}{2}$$

by more than $1\pi$.

The teaching of the above table may be generalized to an arbitrary number of n steps instead of 5 steps. The phase region of $2\pi$ for the first order modulation contrast or the phase region of $4\pi$ for the second order modulation contrast is then divided in n steps which in particular have the same step size.

The microscope images that are taken into calculation to yield a high resolution image may be recorded with two (in particular exactly two) different phase values $\Phi_0$ for the 0. diffraction order, which phase values differ from each other by $\pi$. Furthermore, also the absolute values of $\Phi_0$ may be suitably chosen. $\Phi_0$ determines the z plane in which the illumination pattern has a maximal modulation contrast, i.e., a maximal brightness difference between brightest and darkest areas of the pattern. The modulation contrast thus has a z-dependency that is influenced by $\Phi_0$. The two absolute values of $\Phi_0$ with which the microscope images are recorded may be chosen such that a z-dependent modulation contrast of the illumination pattern has a maximum in a detection plane. The detection plane indicates a plane which is sharply imaged onto a detector/a camera. Generally, absolute values of $\Phi_0$ may be used with which the modulation contrast has at least not a minimum; suitable are also absolute values of $\Phi_0$ with which the z-dependent modulation contrast is closer to its maximum than to its minimum.

The described variants refer to three diffraction orders, however, this number shall not be construed as an upper limit. Further path sections may also be provided which correspond to other diffraction orders, e.g., a $-2$. diffraction order and $+2$. diffraction order. The above statements also apply to those cases. If further diffraction orders are used, ideal numerical values may slightly deviate from the values given herein; nevertheless, advantages can be reached with the values indicated herein.

The description of the $-1$, $0$. and $+1$. diffraction order beam parts relate to the phase shifts for an illumination pattern in a specific orientation. For calculating the high resolution images, also illumination patterns in other orientations are recorded. Again the described different phase shifts are set. The statements regarding the phase shift of the beam part/path section of the 0. diffraction order thus refer to illumination patterns of the same orientation and are also analogously implemented for other illumination pattern orientations.

The invention also relates to a light microscope with an optic arrangement configured as described above. The described variants of the method shall also be considered as variants of the optic arrangement of the invention. In particular, a control unit of the optic arrangement may be configured to control the phase shifters such that the results described with reference to the variants of the method are reached. Further exemplary embodiments may deviate from the indicated numerical values; in particular, deviations of up to 10% or up to 20% of the indicated values may be used, thus realizing the described advantages of the invention at least partially.

BRIEF DESCRIPTION OF THE FIGURES

Further features of the invention are described in the following with reference to the attached schematic figures.

Similar components are referred to with the same reference signs throughout all figures.

DETAILED DESCRIPTION OF THE DRAWINGS

Figure 1:
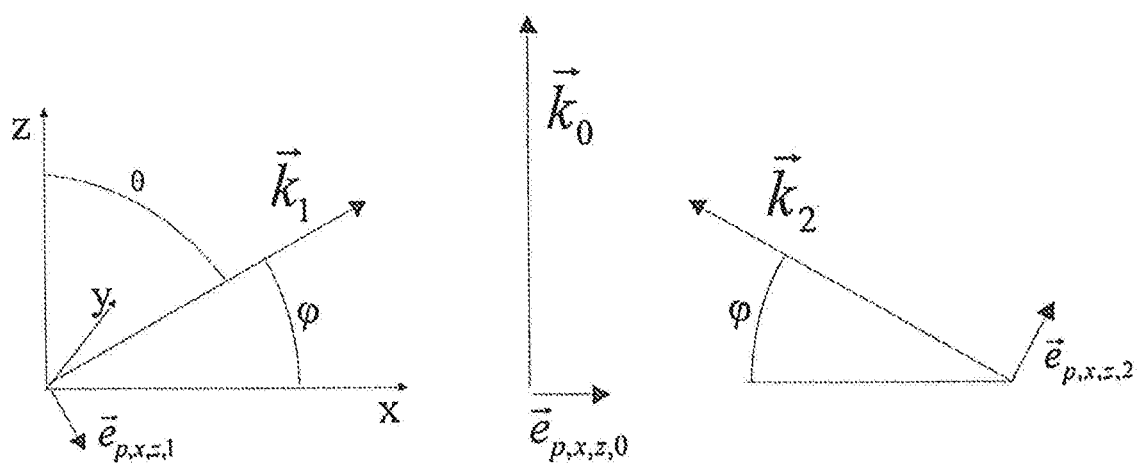
FIG. 1 is a schematic illustration of the wave number vectors of three light beams which correspond to 0., $-1$. and $+1$. diffraction orders and which shall interfere with each other.
Figure 2:
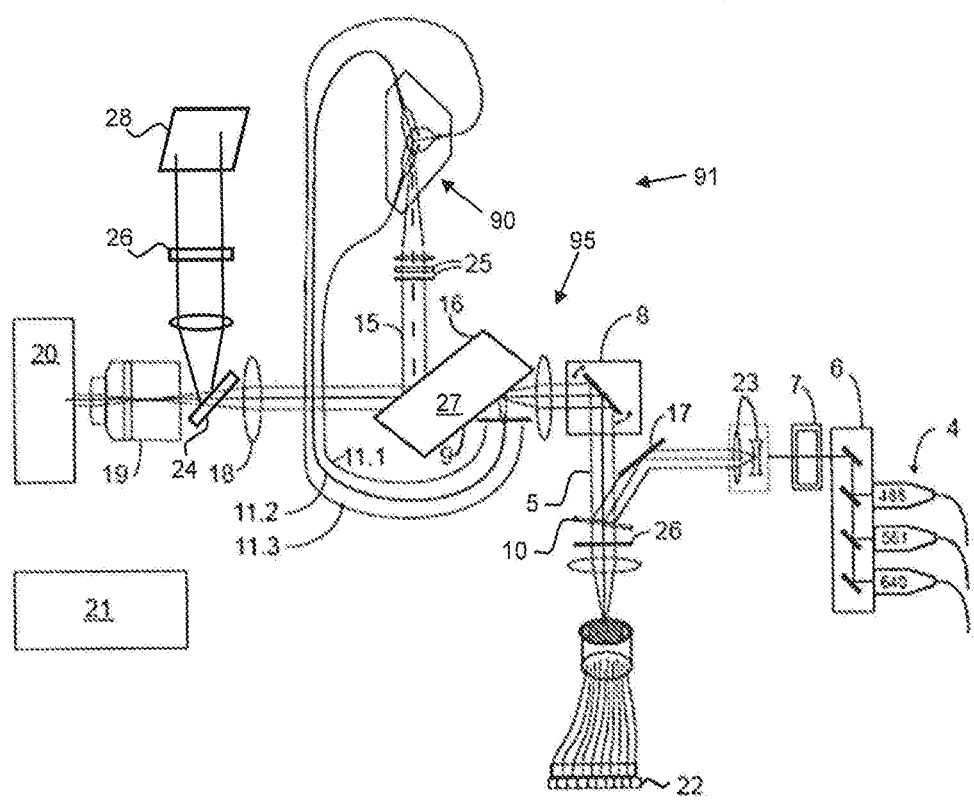
FIG. 2 schematically shows an embodiment of a light microscope with an optic arrangement according to the invention.

FIG. 2 shows schematically an embodiment of a light microscope 1 according to the invention comprising an optic arrangement 95 of the invention.

The microscope 1 comprises a light source 4 which emits light 5 that can be guided via an input port selection device 8 to different input ports of a waveguide chip 90 of the optic arrangement 95. The waveguide chip 90 or the combination of a waveguide chip 90 and input port selection device 8 constitute a structuring device 91 by means of which light exiting the waveguide chip 90 is suitable for structured illumination microscopy (SIM).

The input port selection device 8 is here formed by a scanner 8 with one or a plurality of pivotable mirrors or other pivotable light deflecting elements. In the following description, however, the scanner 8 may also be replaced by other variable beam deflection devices which may, in particular, be based on the acousto-optic principle.

The light source 4 may comprise a plurality of lasers as indicated in FIG. 2. Between the light source 4 and the scanner 8, optionally cascaded mirrors 6 with a plurality of partially transmissive mirrors may be used to combine the beam paths of all lasers onto a common beam path. Furthermore optionally an acousto-optic tunable filter (AOTF) 7 and lenses 23 or a beam expander 23 may be provided.

Depending on the deflection direction of the scanner 8, different input ports of the waveguide chip 90 can be selected. FIG. 2 shows, as an optional design, a plurality of optical fibers 11.1, 11.2 and 11.3 which guide light from the scanner 8 to the different input ports of the waveguide chip 90.

Each input port of the waveguide chip 90 leads to a plurality of exit ports which are arranged in a dot pattern. Light that enters through an input port thus exits the waveguide chip 90 in a dot pattern. A dot pattern consists of coherent light beam bundles which may interfere in a specimen plane 20 to form an illumination pattern. As each input port of the waveguide chip 90 connects to different exit ports, it is possible to switch between different dot patterns.

The exit ports of the waveguide chip 90 may be arranged in a pupil plane. A dot pattern in the pupil plane thus leads to a structured intensity pattern, for example stripes, in the specimen plane 20.

Structured light 15 exiting the waveguide chip 90 is guided to the specimen plane 20 via different optical components which may comprise an optical element 18, for example a tube lens or a zoom arrangement 18, and an objective 19 in addition to further components.

As shown in FIG. 2, the microscope 1 may also comprise a movable deflector 27 arranged between the scanner 8 and the waveguide chip 90. Depending on a position of the bypassing the waveguide chip 90.

The deflector 27 may comprise two reflective surfaces 9 and 16 which are rigidly connected with each other. The reflective surface 9 reflects light from scanner 8 to one of the optical fibers 11.1, 11.2, 11.3. The reflective surface 16 reflects light 15 from the exit ports of the waveguide chip 90 to the optical element 18 and the objective 19.

Light coming from the specimen is detected with a detector or camera 28. For example, a (dichroic) beam splitter 24 may be used to direct light coming from the specimen to the detector/camera 28 (and not to the waveguide chip 90). Another detector 22 may be used for a laser scanning process in which the deflector 27 is arranged such that light 5 is not guided through the waveguide chip 90. Optionally, lenses and filters 26 may be used in front of each of the detector 22 and the camera 28.

A control unit 21 may be configured to control the phase shifters of the waveguide chip 90 which is described in more detail further below.

Figure 3:
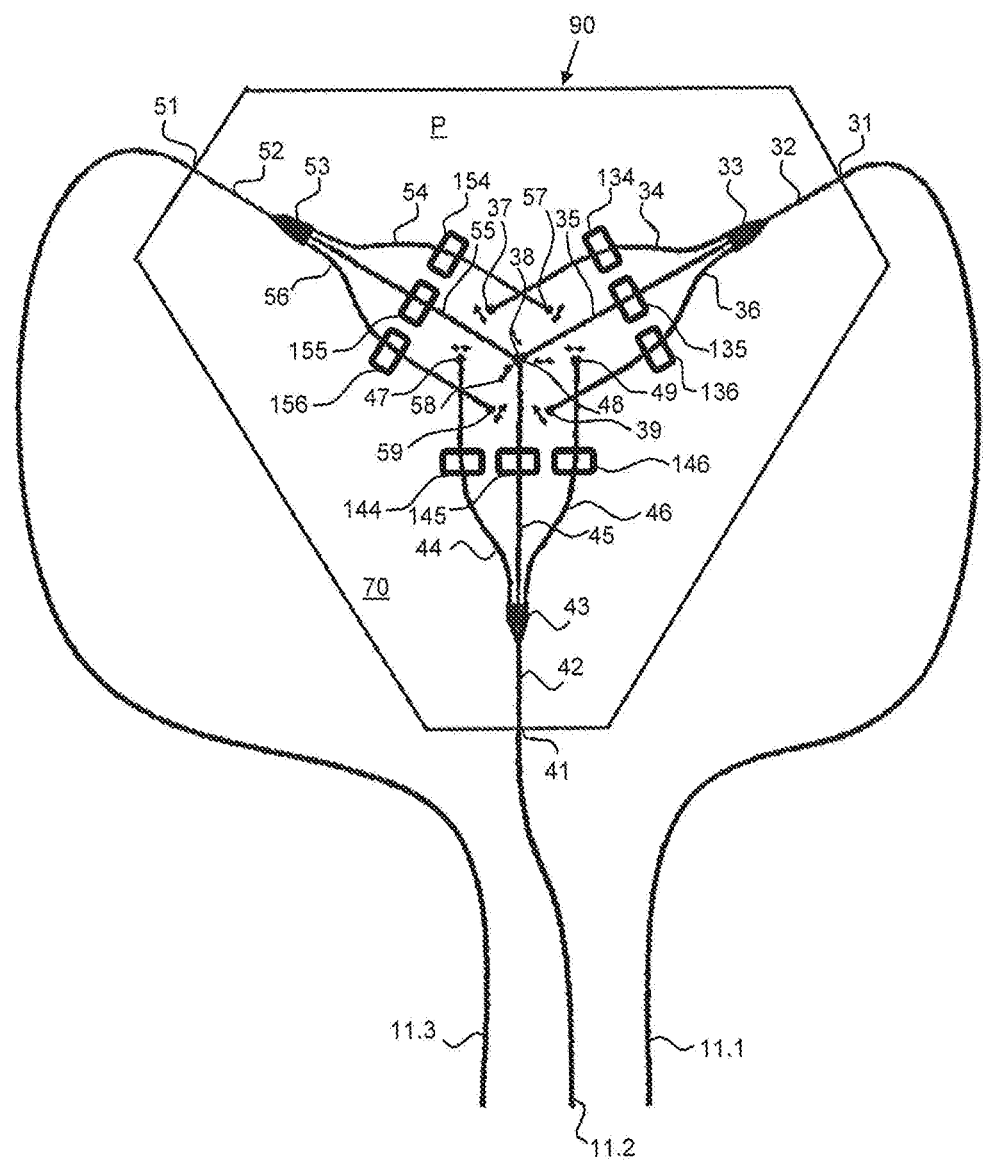
FIG. 3 schematically shows an embodiment of the optic arrangement of FIG. 2.

Turning to FIG. 3, the design of an exemplary waveguide chip 90 is further described. The waveguide chip 90 comprises a substrate 70, for example quartz glass. Within the substrate 70, paths are formed which have another index of refraction than the substrate 70. It is thus possible to guide light along these paths. The waveguide chip 90 comprises a plurality of input ports 31, 41, 51 which are each connected with one path, referred to in the following as light guide paths 32, 42, 52. Optical fibers 11.1, 11.2, 11.3 may optionally be used to guide light to the different input ports 31, 41, 51.

Each light guide path 32, 42, 52 leads to a respective splitter 33, 43, 53 which splits the light guide path 32, 42, 52 into a plurality of parts, referred to as path sections 34-36, 44-46, 54-56. Each path section leads to a respective exit port 37-39, 47-49, 57-59 where light exits the waveguide chip 90.

The depicted example comprises a first, second and third input ports 31, 41, 51. The exit ports 37 to 39 connected with the first input port 31 form a first dot pattern. Analogously, the exit ports 47 to 49 of the second input port 41 and the exit ports 57 to 59 of the third input port 51 form a second and a third dot pattern, respectively.

The waveguide chip 90 defines a plane P which may be arranged in or parallel to a pupil plane. In other words, the (main) directions of the light guide paths 32, 42, 52 span a plane P which is parallel to the pupil plane and may be arranged in the region of the pupil plane or in the pupil plane. All exit ports 37-39, 47-49, 57-59 are thus arranged in the region of or in the pupil plane.

A dot pattern in the pupil plane spatially corresponds to the beam bundles of different diffraction orders of a grating which is conventionally arranged in an intermediate image plane. The diffraction orders comprise in particular a zeroth diffraction order which is a central beam part, and a −1. diffraction order and a +1. diffraction order which may have a common distance to the 0. diffraction order. In a pupil plane, these 0., −1. and +1. diffraction orders may form three dots, substantially along a line.

A central path section 45 with its exit port 48 corresponds to the 0. diffraction order, wherein the exit port 48 may be located at or in the region of an optical axis of the light microscope. The two outer path sections 44, 46 with their respective exit ports 47, 49 correspond to the −1. and +1. diffraction orders. The light parts of the 0., −1. and +1. diffraction orders interfere in the specimen plane and form there an illumination pattern. For calculating a high resolution image, several specimen images with different illumination patterns are consecutively recorded. Differently oriented illumination patterns are here produced by consecutively illuminating the different input ports 31, 41, 51. Furthermore, for each illumination of one of the input ports, several microscope images are recorded which differ in the phase of the illumination pattern.

To vary the phase of the illumination pattern, phase shifters 144, 145, 146 are arranged at the path sections 44, 45, 46 of the 0., −1. and +1. diffraction orders for varying optical path lengths in these path sections 44, 45, 46. The phase shifters 144, 145, 146 are integrated in the waveguide chip 90 and may for example be thermoelectric, piezoelectric, acousto-optic or electro-optic phase shifters. For example, a thermoelectric phase shifter changes the temperature of the respective path section and thus the optical path length. In this way, the phase shifter 145 changes a phase value $\Phi_0$ for light of the 0. diffraction order, the phase shifter 144 changes a phase value $\Phi_{-1}$ (also referred to as $\Phi_2$) for light of F the −1. diffraction order; and the phase shifter 146 adjusts a change of the phase value $\Phi_1$ for light of the +1. diffraction order. As an abbreviation, light of the +1. diffraction order" is used to refer to light that travels through the path section which has its exit port arranged such that (or from which exit port the light is guided such that), when interfering in the specimen plane, the light corresponds to a +1. diffraction order of a grating in an intermediate image plane (which grating is not used here).

As explained in more detail above, the interfering beam parts of the 0., −1. and +1. diffraction orders form an illumination pattern with an intensity that oscillates with a first order modulation contrast and a second order modulation contrast. For varying the phase of the illumination pattern, it is necessary to vary the phases of the first and second order modulation contrasts. The first order modulation contrast is proportional to:

$$\cos\left[\frac{2\pi}{\lambda}\cos(\varphi)\cdot x + \frac{\phi_1 - \phi_2}{2}\right] \cdot \cos\left[\frac{2\pi}{\lambda}(1 - \sin(\varphi))\cdot z + \frac{2\phi_0 - \phi_1 - \phi_2}{2}\right].$$

Its phase is varied in that the phase shifters 144-146 vary the phases $\Phi_0$, $\Phi_1$ and $\Phi_2$.

Starting from an operating point, the phases $\Phi_1$ and $\Phi_2$ are changed in opposite directions. In case of a thermoelectric phase shifter, for example, it starts from an initial temperature which is higher than the ambient temperature and may in particular be equal for both sections 44, 46. Now one of the path sections 44, 46 is heated and the other of the path sections 44, 46 is heated less or is not heated such that its temperature drops. The temperatures of the two path sections 44, 46 are changed such that $\Phi_1$ and $\Phi_2$ are just changed by the same absolute value or have the same absolute value. Depending on whether or not there is a constant phase difference between $\Phi_1$ and $\Phi_2$ which is to be considered in the equations, the phase shifters 144, 146 may thus be controlled such that $\Phi_1=-\Phi_2$ or $\Phi_1=-\Phi_2+$const. is always true, wherein const. is a constant which is constant for the different phase settings with which the microscope images are recorded.

Consider the above expression of the first order modulation contrast for the case that the phases of the +1. and −1. diffraction orders are varied according to $\Phi_1=-\Phi_2$, and $\Phi_0$ would not be varied (which is not part of the claimed matter); it is apparent that in this scenario:

the phase expression $$\frac{2\phi_0 - \phi_1 - \phi_2}{2}$$

in the second cosine term is constant for the different phase settings and thus does not contribute to the phase shifting, the phase expression $$\frac{\phi_1 - \phi_2}{2}$$

in the first cosine term would have to be varied over an interval of $2\pi$ in order that the phase shifting covers a whole period.

For $$\frac{\phi_1 - \phi_2}{2}$$

to cover an interval of $2\pi$, it is necessary to vary each of $\Phi_1$ and $\Phi_2$ by $2\pi$, respectively, i.e., they must in particular have values within the interval $0\pi$ to $2\pi$. This requires disadvantageously large temperature changes.

In contrast, in some embodiments of the invention, $\Phi_1$ and $\Phi_2$ are each varied by only $1\pi$ (or less), and thus $$\frac{\phi_1 - \phi_2}{2}$$

an interval of $\pi$. Nevertheless, variations over the whole phase region shall be possible. To this end, $\Phi_0$ may be changed by $\pi$. This changes the argument of the last cosine term in the above expression by $\pi$, thus changing the +/− sign of this cosine term. The change in the +/− sign corresponds to the mentioned variation of $$\frac{\phi_1 - \phi_2}{2}$$

in the region of $1\pi$ to $2\pi$. Advantageously, with the invention the phase can be shifted over the whole phase region of the intensity modulation, wherein $\Phi_1$ and $\Phi_2$ only need to be varied by rather small amounts and thus only moderate temperature changes are necessary at the path sections 44 and 46.

The above descriptions of the path sections 44-46 and their respective phase shifters 144-146 similarly apply to the other path sections 34-36 and 54-56 with their respective phase shifters 134-136 and 154-156.

Instead of the described phase shifters integrated in the waveguide chip, separate phase shifters may also be arranged in the beam path behind the waveguide chip. For example, transparent wobble plates may be used as phase shifters which provide different optical path lengths of transmitted light depending on their tilt angle.

A high resolution image may now be calculated from a plurality of microscope images, wherein a respective microscope image is recorded for n different phase settings per illuminated input port of the waveguide chip. With the three input ports, 3n microscope images are thus recorded and taken into calculation to form one high resolution image. For all of these phase settings, the phase shifters may be controlled such that $\Phi_1$ and $\Phi_2$ are each set to several different values in an interval with an interval span of each $1\pi$ (or such that $(\Phi_1-\Phi_2)/2$ is set to several values in an interval spanning $1\pi$), and additionally $\Phi_0$ is set to two values which differ from each other by $\pi$. Advantageously, the phase shifters only need to be adjusted over comparably small intervals.

For a particularly good contrast in an interference pattern, the relative intensities of light from the exit ports 47 to 49 are relevant. The first order modulation contrast provides a z modulation and thus provides an axial resolution enhancement (i.e., in z direction/along the optical axis). The second order modulation contrast provides the lateral resolution enhancement. The splitter 43 may be configured such that the intensity in the central exit port 48 is lower than the intensities of the other exit ports 47, 49. For example, the intensity in the central exit port 48 may be between 2% and 25% of the light intensity reaching the splitter 43. The remaining light intensity is shared n equal parts among the two other exit ports 47, 49. These descriptions in turn apply similarly to the other path sections and exit ports.

The groups of exit ports 37-39, 47-49 and 57-59 differ from each other in the arrangement of the resulting dot patterns. Each input port 31, 41, 51 connects with a central exit port 38, 48, 58 which are formed next to each other in a central region which may correspond to an optical axis of the microscope. Distances between the central exit ports 38, 48, 58 are smaller than distances to the other exit ports 37, 39, 47, 49, 57, 59 which are arranged on a circular band around this central region. As it is merely possible to form the central exit ports 38, 48, 58 next to each other and not at exactly the same position, the remaining exit ports 37, 39, 47, 49, 57, 59 may not be arranged exactly on a circle but rather on a circular band, wherein the exit ports 37 and 39 have the same distance to the exit port 38 and similarly the exit ports 47 and 49 have the same distance to the exit port 48 and the exit ports 57 and 59 have the same distance to the exit port 58.

Different dot patterns that are rotated relative to each other correspond in the specimen plane to structured intensity patterns that are rotated relative to each other.

In addition to the depicted path sections, light from an input port can also be distributed into several path sections. The exit ports of these path sections may be arranged to correspond to further diffraction orders, or may form other patterns.

All exit ports of the waveguide chip 90 may be arranged in a common plane P 4 which is in or at a pupil plane. This is achieved in that light is coupled out of the waveguide chip 90 under an angle relative to the directions of the light guide paths 32, 42, 52. The angle may have any value that differs from 0. In particular, the angle to plane P may be approximately 90° or more generally between 20° and 90°.

Figure 4:
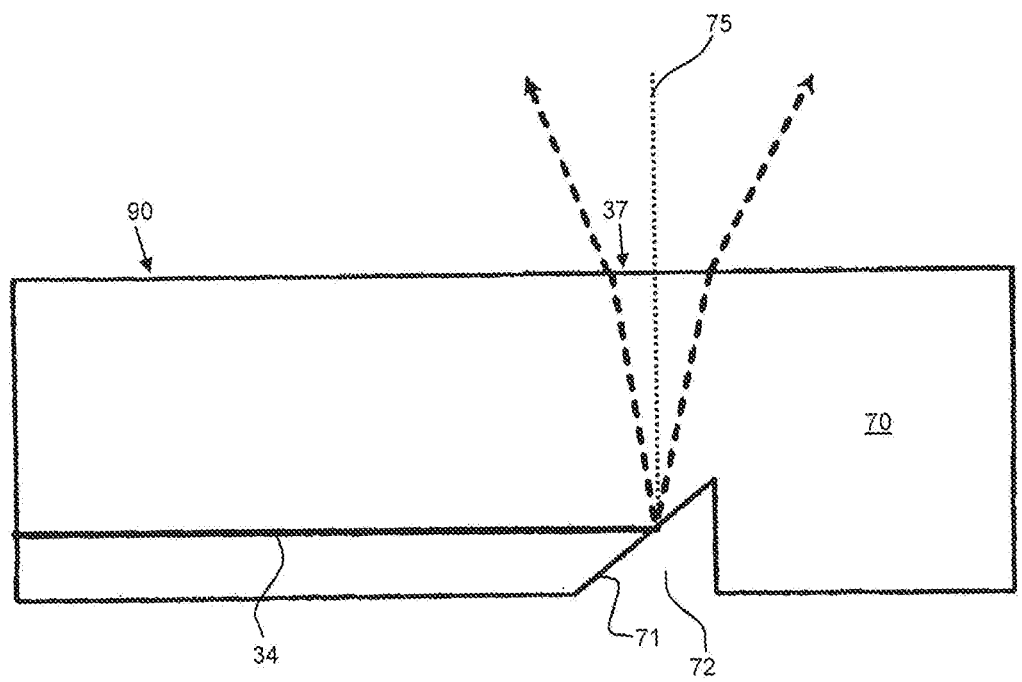
FIG. 4 schematically shows an exemplary design of a part of the optic arrangement of FIG. 2 or 3.

This is further described with reference to FIG. 4 which schematically shows details of the waveguide chip 90 of FIG. 3. FIG. 4 is a cross-sectional view of the waveguide chip 90 and thus this view is perpendicular to the view of FIG. 3.

FIG. 4 shows the path section 34 which leads through substrate 70 to exit port 37. For deflecting and coupling-out light, a recess 72 is formed in the substrate 70, forming a surface 71 or interface 71 that directly borders path section 34. Light from the path section 34 is thus deflected at the interface 71, for example by total internal reflection, then crosses the waveguide chip 90 and exits the waveguide chip 90 at a side opposite to the recess 72 and opposite the interface 71. An angle of reflection at the interface 71 is approximately 90°. FIG. 4 shows in dashed lines a widened light beam, wherein a central dashed line 95 of the widened light beam indicates an exit direction 75 of the light. The exit direction is at an angle of (approximately) 90° to the plane of the waveguide chip. Light reflected by the interface 71 exits the waveguide chip 90 in an area which is referred to as an exit port 37. Such an area may be an interface between the substrate 70 and a surrounding medium, typically air.

If the surface 71 is an interface between air and the substrate/the respective path section, then an evanescent light field penetrates the air. For typically used light wavelengths, this evanescent field may have a size of for example, approximately 100 nm. Due to interaction with air molecules, the evanescent field may cause damage to the surface 71. To avoid such problems, the surface 71 may be coated (for example with a metal or a dichroic layer) to reduce/avoid interaction of an evanescent field with air. Alternatively, the recess 72 may be provided with a cover and filled with a protective gas, for example Argon. The surface 71 then contacts the protective gas which does not interact with the evanescent field.

Instead of using total internal reflection, it is also possible to provide a mirror at the surface 71.

After the reflection at the interface 71, a light beam widens and thus exits the waveguide chip 90 with a larger cross-section compared with a case in which the light beam would leave the waveguide chip 90 at the interface 71 without previously crossing the substrate. The larger cross-section reduces a peak intensity over the cross-section. This reduced peak intensity ensures that no damages occur at the surface 37 at which the light exits the wave guide. Advantageously, no further elements (for example end caps as used at optical fibers) are necessary for coupling light out of the waveguide chip 90. Rather, light may simply exit the substrate 70 without further elements being required.

Additional optical elements, for example a microlens or a half-wave plate, may be directly attached to the exit port (i.e., the area of the substrate where reflected light exits). Such an efficient arrangement and attachment of microlenses or other components would not be possible if light were to exit the waveguide chip at the side of the interface/mirror 71.

The efficiency of each splitter depends on the polarization of incoming light. Preferably, the light is linearly polarized in a direction in which the light is split (as indicated with the arrows in FIG. 3). SIM requires, however, a polarization which is preferably perpendicular to this orientation. It is thus advantageous to rotate the polarization of the light after the splitter.

Figure 5:
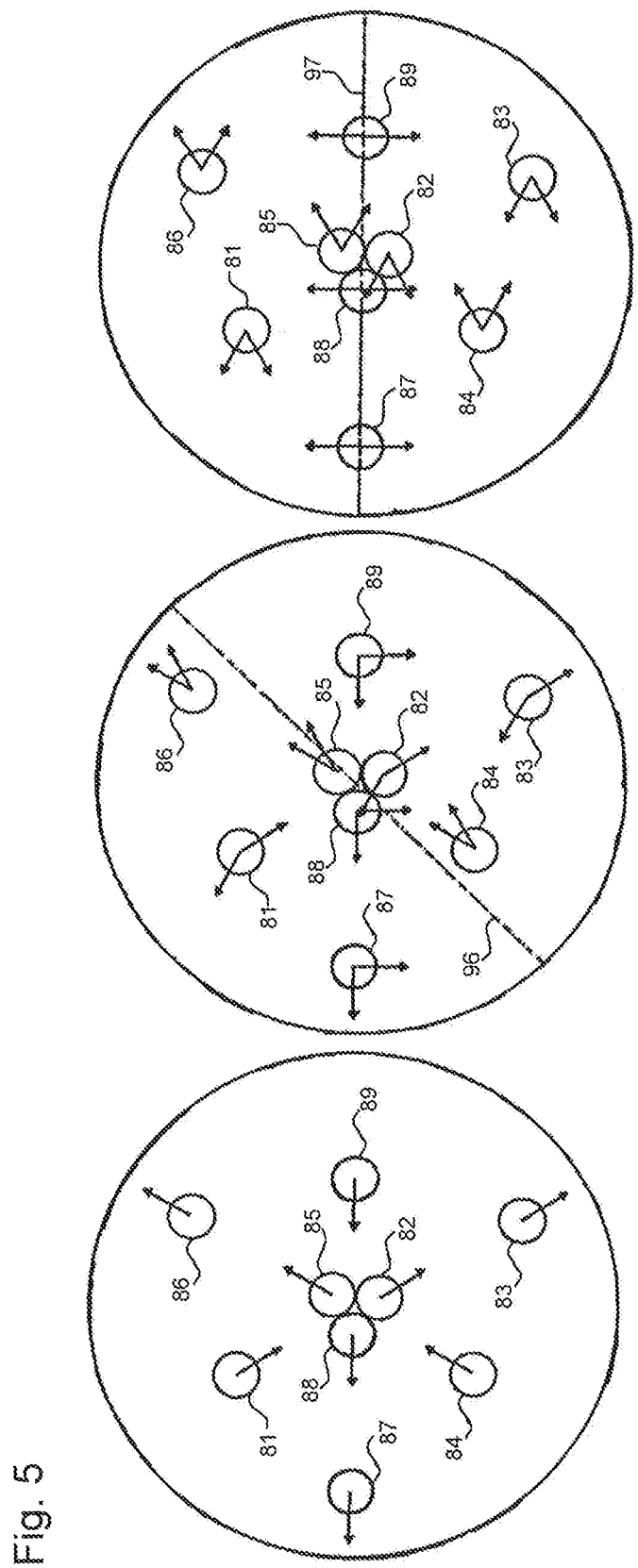
FIG. 5 schematically shows the positions and polarization directions of light beams at or behind a waveguide chip of a light microscope of the invention.

This is further explained with reference to FIG. 5 which shows the three dot patterns in its left part. A first dot pattern comprises the light dots/spots 81, 82, 83 in a pupil plane corresponding to the exit ports 37 to 39. A second dot pattern comprises the light dots 84 to 86 which correspond to the exit ports 47 to 49. A third dot pattern finally comprises the light dots 87 to 89 corresponding to the exit ports 57 to 59. The polarization direction of each light spot 81 to 89 is indicated with an arrow.

Two half-wave plates may be provided to rotate the polarization direction always by 90°. Such half-wave plates 25 are shown in FIG. 2 between the waveguide chip 90 and the specimen plane 20. The half-wave plates 25 may be directly arranged at the exit ports of the waveguide chip 90. In this way, smaller cross-sections of the plates 25 suffice. The polarization directions of the light dots/light spots 81-89 before and after the first half-wave plate are indicated with arrows in the central part of FIG. 5. This central part of FIG. 5 also shows the orientation of the fast axis 96 of the first half-wave plate. Note that only the angle between the axes of the two half-wave plates is relevant but not their absolute orientation. The r right part of FIG. 5 shows the polarization directions of the light spots 81-89 before and after the second half-wave plate. The fast axis 97 of the second half-wave plate is also indicated. As shown in the right part of FIG. 5, the polarization direction of each light spot is rotated by 90° and is then perpendicular to a line which connects the dots 81-83 of one dot pattern.

Turning to FIG. 3, the surface of the substrate at each exit port 37 may also be provided with a structure acting as a half-wave plate. This replaces one of the two half-wave plates.

The described optic arrangement comprising a waveguide chip allows fast switching between different illumination patterns that differ in their respective orientation and phase. The optic arrangement may be compact with only a small number of movable components. The advantageous phase variation at light guide paths corresponding to a 0. diffraction order allows to particularly efficiently provide illumination patterns with different phases. The exemplary embodiments shown in the figures may also be modified such that the structuring device is formed without the waveguide chip. For example, instead of the waveguide chip, splitters and optical fibers may be provided to produce the same dot patterns described with reference to the figures. Furthermore, a grating or phase modulators may be used instead of the waveguide chip to provide the coherent beam parts. For each beam part that is guided to the specimen plane, at least one respective phase shifter may be provided so that all beam parts can be phase-shifted independently from each other. Beam parts that are produced with a grating and for which there are no phase shifters may be filtered out before reaching the specimen plane.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled n the art to best utilize the invention and various embodiments with various modifications as are suited to the particular use contemplated.

LIST OF REFERENCE SIGNS 1 light microscope
4 light source
5 light
6 cascaded mirrors for combining the beam paths
7 AOTP 8 scanner
9, 16 reflective surfaces of the movable deflector
10 dichroic beam splitter
11.1, 11.2, 11.3 optical fibers
15 structured light exiting the waveguide chip
18 zoom arrangement
19 objective
20 specimen plane
21 control unit
22 detector
23 lenses
24 dichroic beam splitter
25 exit polarization unit with half-wave plates
26 filter
27 movable deflector
28 camera
31, 41, 51 input ports of the waveguide chip
32, 42, 52 light guide paths
33, 43, 53 splitters formed in the waveguide chip
34, 35, 36;
44, 45, 46;
54, 55, 56 path sections of the waveguide chip
37, 38, 39;
47, 48, 49;
57, 58, 59 exit ports of the waveguide chip
70 substrate of the waveguide chip
71 interface for deflecting light out of the waveguide chip
72 recess in the substrate of the waveguide chip
75 exit direction of light out of exit ports
81 to 89 light spots in a pupil plane
90 waveguide chip
91 structuring device
95 optic arrangement
96, 97 fast axes of the half-wave plates
134, 135, 136 phase shifters for the path sections 34, 35, 36
144, 145, 146 phase shifters for the path sections 44, 45, 46
154, 155, 156 phase shifters for the path sections 54, 55, 56
P plane defined by the waveguide chip.

What is claimed is:

1. A method for operating a light microscope with structured illumination, comprising:
    providing illumination patterns by means of a structuring device which splits impinging light into at least three coherent beam parts which correspond to a −1., 0. and +1. diffraction orders of light;
    providing phase shifters not only for the beam parts of the −1. and +1. diffraction orders but also at least one phase shifter for the beam part of the 0. diffraction order;
    generating different phases of the illumination patterns by setting different phase values for the beam parts with phase shifters, comprising setting at least two different phase values $\Phi_0$ with the at least one phase shifter for the 0. diffraction order; and
    recording at least one microscope image for each of the illumination patterns and calculating a high resolution image from the recorded microscope images.

2. The method as defined in claim 1,
    further comprising: setting two different phase values $\Phi_0$ with the phase shifter for the 0. diffraction order, which phase values $\Phi_0$ differ from each other by π, and recording at least one microscope image for each set phase value $\Phi_0$ which are used to calculate the high resolution image.

3. The method as defined in claim 2,
    further comprising: setting a plurality of different phase values with the phase shifters of the −1. and +1. diffraction orders for each of the two phase values $\Phi_0$ of the phase shifter for the 0. diffraction order; and
    recording at least one microscope image for each set phase value, and calculating the high resolution image from these microscope images.

4. The method as defined in claim 1,
    further comprising: changing settings of the two phase shifters of the −1. and +1. diffraction orders in opposite directions, starting from an operating point, for providing the different illumination patterns.

5. The method as defined in claim 4,
    further comprising: changing settings of the two phase shifters of the −1. and +1. diffraction orders in opposite directions, starting from an operating point, such that the two set phase values of the −1. and +1. diffraction orders are changed by the same absolute value but with different +/− sign.

6. The method as defined in claim 1,
    further comprising: changing settings of the phase shifters of the −1. and +1. diffraction order in an interval which at most spans a phase shift of a first order modulation contrast of π, for providing the different illumination patterns; and
    additionally setting a change of the phase value $\Phi_0$ with the phase shifter for the 0. diffraction order, for providing phase shifts of a first order modulation contrast corresponding to a phase shift larger than π.

7. The method as defined in claim 1,
    further comprising: for providing the different illumination patterns, changing settings of the phase shifters of the −1. and +1. diffraction orders such that always $0\pi \leq (\Phi_1 - \Phi_{-1})/2 \leq 1\pi$ applies, wherein $(\Phi_1 - \Phi_{-1})/2$ indicates a phase value of the first order modulation contrast, $\Phi_1$ indicates the phase value of the 1. diffraction order, and $\Phi_{-1}$ indicates the phase value of the −1. diffraction order,
    wherein for providing a phase shift of the first order modulation contrast within an interval from 1π to 2π, changing the phase value $\Phi_0$ for the 0. diffraction order by π and still changing settings of the phase shifters of the −1. and +1. diffraction orders such that always $0\pi \leq (\Phi_1 - \Phi_{-1})/2 \leq 1\pi$ applies.

8. The method as defined in claim 1,
    wherein the structuring device comprises a waveguide chip which splits impinging light into at least three path sections leading to at least three exit ports,
    wherein the at least three exit ports and their respective path sections correspond to the −1., 0. and +1. diffraction orders of light.

9. The method as defined in claim 8,
    wherein the phase shifters are provided at the waveguide chip at the path sections of the −1., 0. and +1. diffraction orders.

10. The method as defined in claim 9,
    wherein the phase shifters are one of: thermal phase shifters, piezoelectric phase shifters, electro-optic phase shifters or acousto-optic phase shifters.

11. The method as defined in claim 10,
    wherein a maximal difference between settings of the phase shifters of the −1. and +1. diffraction orders, i.e., a maximal temperature difference between two thermal phase shifters, or a maximal voltage difference between settings of two piezoelectric or electro-optic phase shifters or a maximal frequency difference between settings of two acousto-optic phase shifters, is at most as large that $(\Phi_1-\Phi_{-1})/2 \leq 1\pi$ still applies at the maximal difference, wherein $\Phi_1-\Phi_{-1}$ is the difference between the phase shifts of the −1. and +1. diffraction orders that are set for the maximal difference.

12. The method as defined in claim 1, further comprising: setting two different phase values $\Phi_0$ for the 0. diffraction order when recording the microscope images from which the high resolution image is calculated, which phase values $\Phi_0$ differ from each other by $\pi$ and have absolute values such that a z-dependent modulation contrast of the illumination pattern has a maximum in a detection plane which is sharply imaged onto a detector, wherein z is the propagation direction of the light.

13. An optic arrangement for structured illumination in a light microscope, comprising[ ]:

a structuring device configured to split impinging light in at least three coherent beam parts which correspond to a −1., 0. and +1. diffraction orders of light;

a plurality of phase shifters configured to shift the phases of the beam parts for setting different phases of illumination patterns; and a control unit configured for:

setting different phase shifts not only with the phase shifters of the −1. and +1. diffraction orders, but also setting at least two different phase values with the phase shifter or phase shifters belonging to the 0. diffraction order; and calculating the high resolution image from the thus recorded microscope images.

14. The optic arrangement as defined in claim 13, wherein the structuring device comprises a waveguide chip configured to split impinging light into at least three path sections leading to at least three exit ports, wherein the at least three exit ports and their respective path sections correspond to the −1., 0., and +1. diffraction orders of light.

15. A light microscope comprising an optic arrangement as defined in claim 13.

* * * * *

UNITED STATES PATENT AND TRADEMARK OFFICE
CERTIFICATE OF CORRECTION

PATENT NO. : 11,598,941 B2
APPLICATION NO. : 16/423983
DATED : March 7, 2023
INVENTOR(S) : Ralf Netz and Gerhard Krampert It is certified that error appears in the above-identified patent and that said Letters Patent is hereby corrected as shown below:

In the Specification

Column 13, Lines 12-13:
Now reads: "Depending on a position of the bypassing the waveguide chip 90."
Should read: -- Depending on a position of the deflector 27, light is either guided to waveguide chip 90 or directly to the specimen plane 20, bypassing the waveguide chip 90. --

Column 14, Line 32:
Now reads: "for light of F the -1. diffraction order;"
Should read: -- for light of the -1. diffraction order; --

Column 16, Line 33:
Now reads: "is shared n equal parts"
Should read: -- is shared in equal parts --

Column 16, Line 62:
Now reads: "in a common plane P 4 which is"
Should read: -- in a common plane P which is --

Column 18, Line 67:
Now reads: "7 AOTP"
Should read: -- 7 AOTF --

In the Claims

Column 21, Line 19:
In Claim 13 Now reads: "comprising[ ]:"
Should read: -- comprising: --

Signed and Sealed this
Twenty-sixth Day of March, 2024

Katherine Kelly Vidal
*Director of the United States Patent and Trademark Office*